United States Patent [19]

Hecker

[11] 4,199,183

[45] Apr. 22, 1980

[54] INTERNAL GRIPPER APPARATUS HAVING POSITIVE CONTAINER ALIGNMENT

[75] Inventor: Michael F. Hecker, Santa Barbara, Calif.

[73] Assignee: Industrial Automation Corp., Goleta, Calif.

[21] Appl. No.: 914,763

[22] Filed: Jun. 12, 1978

[51] Int. Cl.² ............................................... B66C 1/42
[52] U.S. Cl. ...................................... 294/97; 198/696; 414/416
[58] Field of Search ............... 214/1 BA, 309; 294/93, 294/94, 95, 96, 97, 115, 116; 414/416, 753; 198/694, 696

[56] References Cited

U.S. PATENT DOCUMENTS

| | | | |
|---|---|---|---|
| 2,271,206 | 1/1942 | Pollard et al. ...................... | 294/95 |
| 2,609,109 | 9/1952 | Ardell ................................. | 214/309 |
| 3,601,261 | 8/1971 | Michot ............................... | 294/95 X |
| 3,938,847 | 2/1976 | Peyton ............................... | 214/309 X |
| 4,032,185 | 6/1977 | Peyton ............................... | 214/1 BA X |
| 4,086,999 | 5/1978 | McDonald .......................... | 214/1 BA X |

FOREIGN PATENT DOCUMENTS 681545 3/1964 Canada ...................................... 214/95

Primary Examiner—L. J. Paperner
Attorney, Agent, or Firm—Blakely, Sokoloff, Taylor & Zafman

[57] ABSTRACT

An improved internal gripper apparatus for use in uncasers and the like for controllably gripping bottles or other containers from within for transport and release as desired. The internal grippers are spring-loaded to an outer position though automatically retract as required for insertion into the mouth of a container, gripping the container near the top, or at the ridge adjacent the top of the container characteristic of many containers. The improvement comprises a guide ring on the gripper at an elevation approximately equal to the highest relative position of a container during normal operation of the gripper apparatus. The guide ring may limit the uppermost position of any part of the container top or confine the radial position thereof, preferably both, to positively locate the container top and prevent cocking thereof. Chamfering of the lower edge of the ring provides a guide to encourage the gripper and container into axial alignment as the gripper proceeds into a container.

11 Claims, 8 Drawing Figures

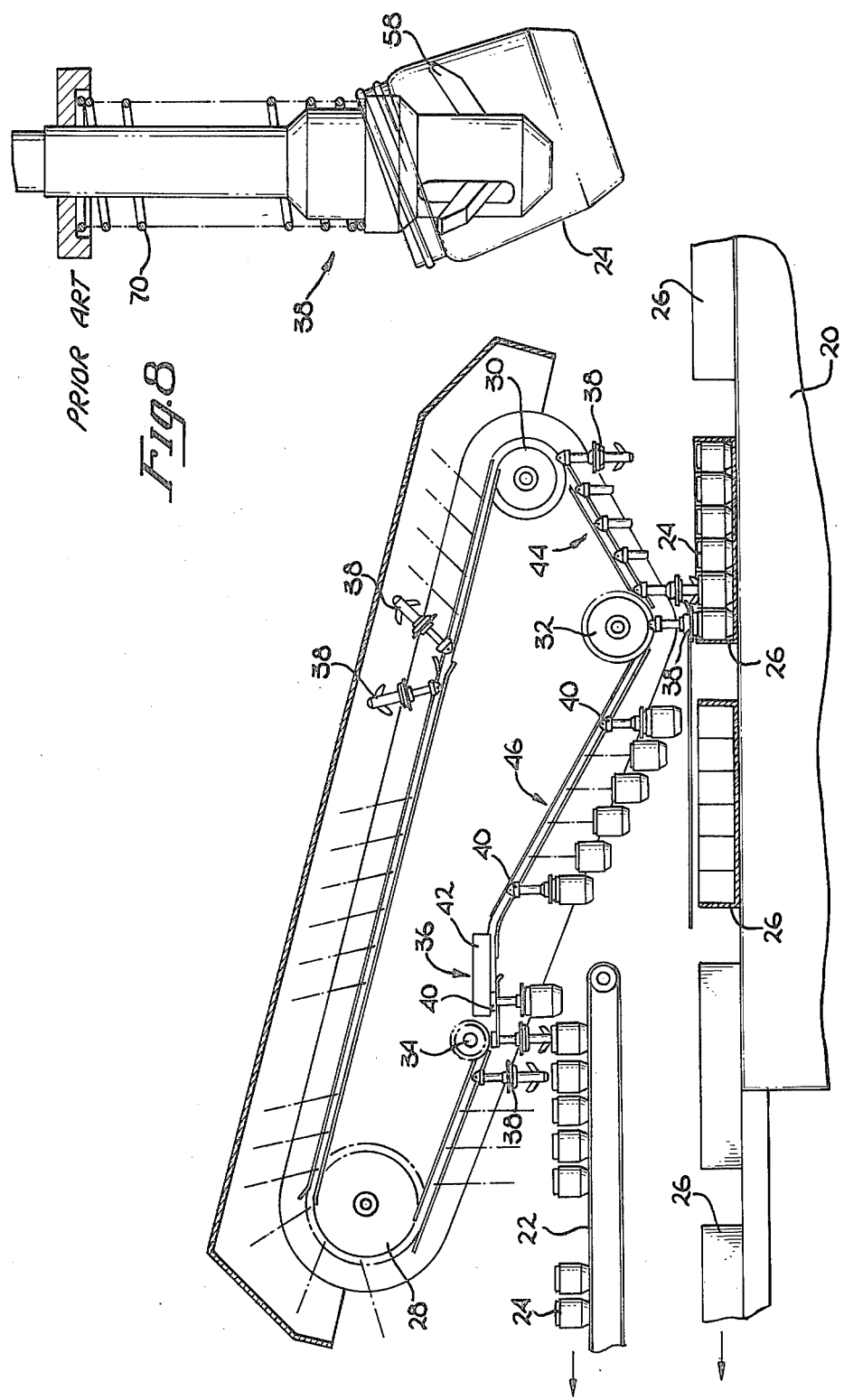

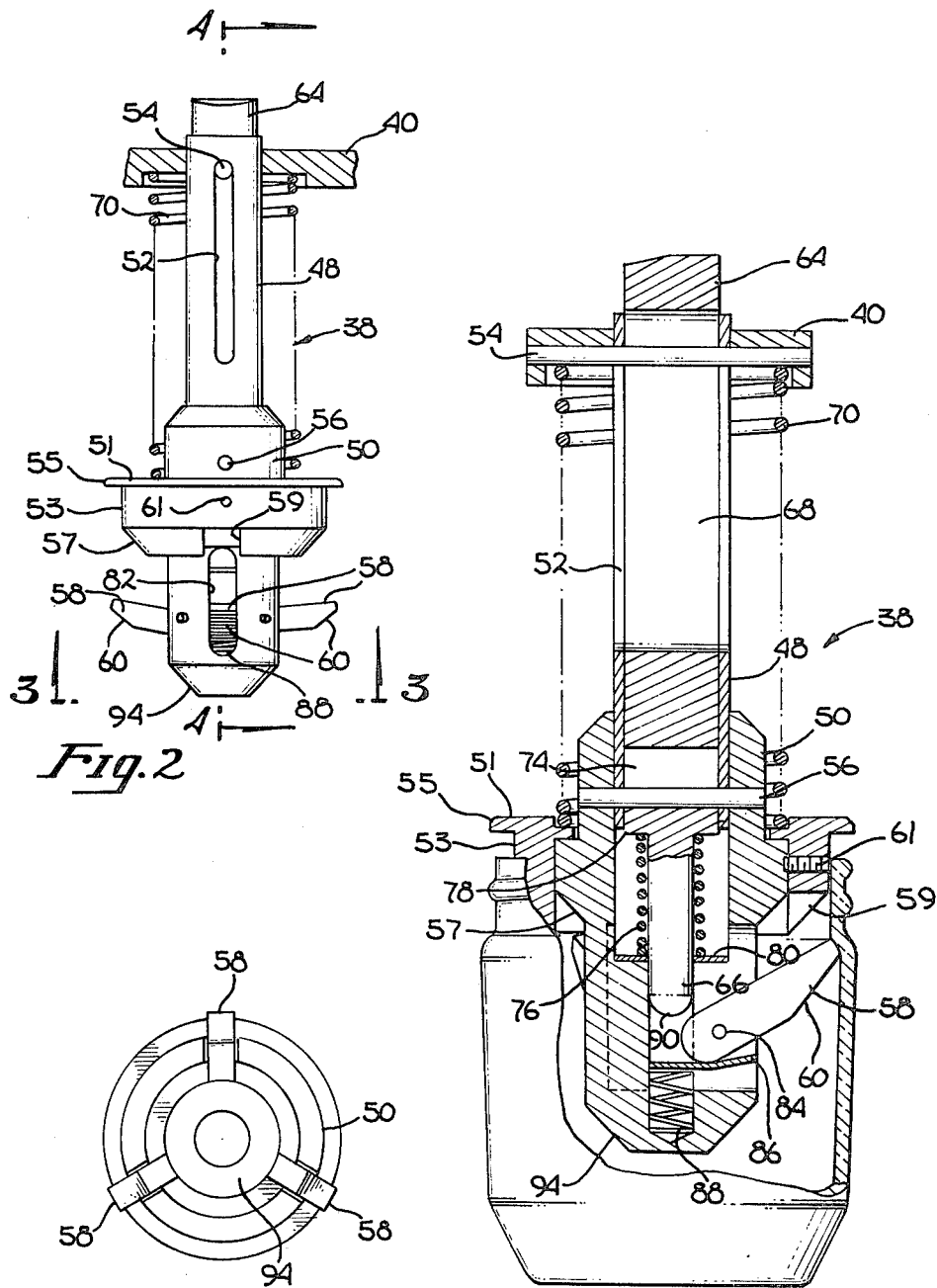

INTERNAL GRIPPER APPARATUS HAVING POSITIVE CONTAINER ALIGNMENT

BACKGROUND OF THE INVENTION

1. Field of the Invention

The present invention relates to the field of the container handling apparatus, and more particularly to the field of apparatus for individually handling containers as may be used in container uncasing apparatus.

2. Prior Art

Various types of container handling apparatus are well known in the prior art. Of particular interest is the internal gripper apparatus of U.S. Pat. No. 4,032,185, as the preferred embodiment of the present invention comprises an improvement to that gripper. That patent discloses internal gripper apparatus for use in uncasers and the like for controllably gripping bottles or other containers from within for transport and release as desired. The internal grippers are spring-loaded to an outer position though automatically retract as required for insertion into the mouth of a container, gripping the container near the top, or at the ridge adjacent the top of the container characteristic of many containers. The grippers have an upward extending centrally disposed actuating member which may be slidably encouraged to a lower position to retract the grippers and release a container held thereby. The grippers provide relatively close axial positioning of the containers to provide the desired separation of containers on container handling apparatus, and further include supporting structure to allow retraction of the gripper on engagement with broken or inverted containers or other obstructions in the normal operation of the gripper apparatus.

Fabrication of certain major gripper components from plastic materials having high impact resistance and self-lubricating characteristics such as Delrin provides long, substantially maintenance-free life for the grippers. Also, by appropriately proportioning the grippers and perhaps allowing some settling of the containers onto a receiving conveyor, a simple, short duration release actuation of the gripper will provide positive releasing of containers handled thereby.

Also known in the prior art are grippers for retaining containers from within generally having some form of pneumatic apparatus, depending upon the actuation of a pneumatically expandable and contractable bladder in each gripper to provide the gripping and release functions. Such grippers generally operate satisfactorily, though result in certain complexities because of the requirements of a vacuum or pressure source as a prime mover, the connection of each individual gripper on a transport mechanism to the pressure or vacuum source, and the control of the pressure or vacuum source for individual grippers to provide the gripping and release at the appropriate points of progress of the transport system.

One form of mechanical case unloader is disclosed in U.S. Pat. No. 2,609,109. In this unloader a row of internal grippers is mechanically operated in unison by a single operating mechanism, providing substantially positive vertical motion and gripping action as a result of the unitary actuating mechanism.

BRIEF SUMMARY OF THE INVENTION

An improved internal gripper apparatus for use in uncasers and the like, for controllably gripping bottles or other containers from within for transport and release as desired. The internal grippers are spring-loaded to an outer position though automatically retract as required for insertion into the mouth of a container, gripping the container near the top, or at the ridge adjacent the top of the container characteristic of many containers. The improvement comprises a guide ring on the gripper at an elevation approximately equal to the highest relative position of a container during normal operation of the gripper apparatus. The guide ring may limit the uppermost position of any part of the container top or confine the radial position thereof, preferably both, to positively locate the container top and prevent cocking thereof. Chamfering of the lower edge of the ring provides a guide to encourage the gripper and container into axial alignment as the gripper proceeds into a container. Alternate embodiments are disclosed.

BRIEF DESCRIPTION OF THE DRAWINGS

FIG. 1 is a side view of a case unloader generally in accordance with U.S. Pat. No. 3,938,847, illustrating the mounting and operation of grippers incorporating the present invention.

FIG. 2 is a partial cross section of a support bar providing a side view of a gripper attached thereto.

FIG. 3 is a bottom view of the gripper of FIG. 2 taken along line 3—3 of that Figure.

FIG. 5 is a partial cross section of a gripper illustrating its full engagement with a container.

FIG. 8 is an illustration of a second and undesired stable gripping state of a prior art gripper avoided by the present invention.

DETAILED DESCRIPTION OF THE INVENTION

Figure 4:
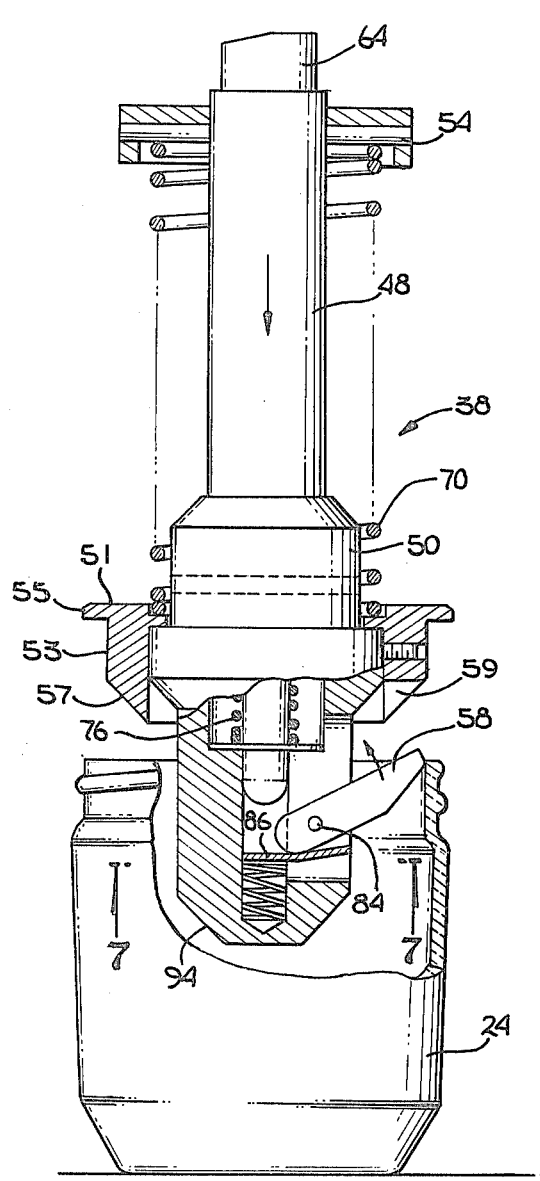
FIG. 4 is a partial cross section of a gripper taken along line 4—4 of FIG. 2, illustrating the insertion of the gripper into a container.

The present invention comprises improved internal gripping apparatus for the handling of containers, typically large mouth containers, as may be encountered in the various processing and packaging industries. The specific embodiment disclosed in detail herein represents an improvement in apparatus substantially in accordance with U.S. Pat. No. 4,032,185. Therefore, for purposes of clarity, certain portions of that patent are in essence presented herein, the description of the present invention being interleaved to highlight the cooperation of the various parts and functions. That prior equipment, as well as the preferred embodiment of the present invention, is designed and configured for use in a "case unloader" to adapt such equipment for the removal of large mouth bottles and other containers from cartons or cases by gripping the containers from within the opening thereof. More particularly, the specific embodiment disclosed herein is designed to be mountable on the apparatus of the full depth uncaser disclosed in U.S. Pat. No. 3,938,847; accordingly, only certain aspects of that apparatus will be described herein, the remainder of such apparatus being described in detail in the later foregoing patent.

Referring now to FIG. 1, a cross section through the case unloader of U.S. Pat. No. 3,938,847 incorporating the present invention may be seen. This cross section in essence shows the various general functional elements of the case unloader in a rather schematic form, thereby illustrating the purpose and manner of use of the specific embodiment of gripper hereinafter disclosed in detail. The case unloader is designed to operate in conjunction with a case feeder system, generally indicated by the number 20, for providing cases to be unloaded to the uncaser, and a receiving conveyor 22 for receiving the containers 24 removed from the cases 26 on the feeder system 20. The uncaser utilizes a continuous chain at each side thereof supported on the one side shown by sprockets 28, 30, 32 and 34, and further guided by slides between the sprockets which, among other things, establish a short, relatively straight horizontal chain path in the region 36 above the receiving conveyor 22. The individual grippers 38 are supported in rows on horizontal bars 40 extending between like positions on the two adjacent chains and guided at various times by guides at each end of the bars 40 by cam-like slide devices to determine the angular orientation (position of the center line) of the grippers as suggested in the FIGURE. In region 36 the angular orientation of the bars 40 is further determined by a slide manner 42 positioned to intersect and stabilize the bars at the position immediately above the entry to the receiving conveyor 22. As disclosed in the foregoing patent, the downward slope of the gripper trajectory in region 44 is the same as the upward slope in region 46, so that by spacing the grippers slightly further apart on the chain than the containers in the cases to be unloaded, and by having the linear speed of the chain slightly higher than the linear speed of the cases in accordance with the incline of chain sections 44 and 46, the grippers will generally be accurately aligned with the container positions in the cases, both in the downward portion of the trajectory (in Section 44) and during the container removal portion of the trajectory (Section 46).

Now referring to FIGS. 2 and 3, a side view and a bottom view, respectively, of a gripper 38 may be seen. The major gripper assembly is comprised of an upper housing 48 and a lower housing 50. The upper housing 48 in the preferred embodiment is a stainless steel tubular member having longitudinal diametrically opposed slots 52 for supporting the assembly on one of the horizontal bars 40 by means of a mounting pn 54. The upper housing 48 extends into a mating opening at the top of the lower housing 50, with the two parts being retained in the respective positions shown by a roll pin 56. Mounted on the lower housing 50 is a ring-like member 51, characterized by a cylindrical portion 53 terminating in a flanged region 55 at the upper limit thereof and a tapered region 57 at the lower extremity thereof. Other parts of the gripper visible in FIGS. 2 and 3 include three gripper fingers 58, symmetrically disposed and outward extending from the lower region of the lower housing 50. It will be noted, particularly in FIG. 2, that the fingers 58 normally assume a somewhat upwardly inclined, outwardly extending position, with the lower portion of the outer region 60 of the fingers being beveled so as to define a surface having a substantial upward inclination. As shall subsequently be described in detail, the ring member 51 has relieved areas 59 above each finger 58 so as to not inhibit the upward movement of the fingers.

Now referring to FIG. 5, a partial cross section of the gripper 38 may be seen. In this FIGURE the gripper is shown in a gripping relationship with a typical container for which it may be used, specifically one of the wide mouth containers 24. Centrally disposed within the upper and lower housings 48 and 50 is an actuator 62 having an upper end 64 extending above the top of the upper housing 48 and a lower coaxial extension 66 for actuating the fingers 58. An extended through-slot in region 68 of the actuator 64 provides clearance for the mounting pin 54 in the same manner as the slot 52 in the upper housing 48, to allow (i) the relative vertical motion of the actuator 64 with respect to the upper housing 48 and the pin 54, and (ii) to allow vertical motion of the entire gripper assembly 38 with respect to the pin 54. A support spring 70 is retained within a bore 72 and the top region of ring member 51 to encourage the gripper assembly to the lowermost position limited by the upper end of the slot 52 in the upper housing 48, at which position the actuator 62 still enjoys a further downward travel capability. The spring also helps retain the ring 51 against the facing surface of the lower housing 50. In the preferred embodiment, the ring is also retained by set screws 61 to maintain angular alignment of the fingers 58 and the relieved area 59 in the ring 51.

The actuator 62 has a second slot 74 therein adjacent the lower extension 66 through which the roll pin 56 passes, thereby defining the limit of vertical travel of the actuator 62 with respect to the upper housing 48 and the lower housing 50. The actuator 62 is retained normally in the upper position defined by the roll pin 56 and the slot 74 by a coil spring 76 operating between a shoulder 78 on the actuator 62 and a washer 80 disposed on an appropriately disposed shoulder within the lower housing 50.

Figure 7:
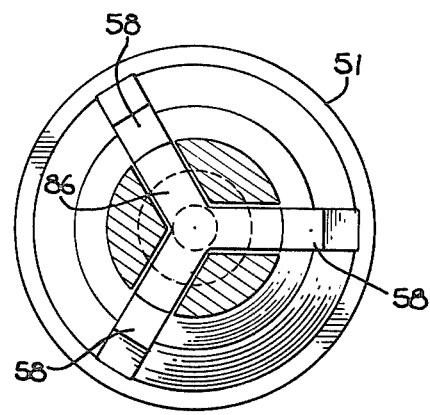
FIG. 7 is a cross sectional view of a gripper taken along line 7—7 of FIG. 4, illustrating the planform of the finger extender plate.

The lower housing 50 has three equally spaced slots 82 about its lower periphery (see also FIG. 2) within which the fingers 58 are disposed, being retained for limited rotation about horizontal axes by three roll pins 84 extending through the fingers and the adjacent lower housing walls. The fingers 58 are normally encouraged to the outward, slightly upward extending position illustrated in FIG. 2 by a three legged finger extender plate 86, encouraged to an upper position by an extender plate spring 88 in the lower region of the lower housing 50 so as to provide a cam action against the lower surface of the fingers 58. In FIG. 5, however, since the gripper is shown in a gripping relationship with a container, the fingers 58 are disposed in a more upward projecting angle than in FIG. 2, with the finger extender plate 86 providing a cam action to lightly, but positively, encourage the fingers to a more outwardly directed disposition. (See also FIG. 7 for the planform of the finger extender plate 86.)

it will be noted in the assembly of FIG. 5 that when in the normal gripping position the support spring 70 encourages the entire gripping assembly into the lowermost position shown and the spring 76 encourages the actuator 64 into the uppermost position (limited by the bottom of slot 74 in the actuator 62 and the pin 56) with respect to upper and lower housings 48 and 50 respectively, thereby moving the lowermost end 90 from engagement with the innermost ends of the fingers 58. At the same time, spring 88 encourages the finger extender plate 86 against the lower inner end of the fingers 58, encouraging the fingers to the more outward extending position to retain the fingers in engagement with the containers 24, more particularly, with the inner region of the slight step or ridge 92 adjacent the top of the container. In this regard it should be noted that the actuator 62, the lower housing 50 and the fingers 58 in the preferred embodiment are manufactured from Delrin, a plastic similar to nylon and having a substantial self-lubricating quality. This, in combination with the fact that the fingers 58 are encouraged to the outward extending position by a single spring 88 and finger extender plate 86, more specifically by contact with the plate 86 relatively close to the axis of the gripper, provides significant self centering characteristics of the gripper assembly by encouraging the fingers to approximately equal extents of extension, and increasing the extending force on a finger having lesser extension than the others. Thus, the combination of three or more equally extending fingers and the nearly centrally disposed unitary spring actuation force provides a substantial self-centering effect so that if a container is initially engaged in a non-coaxial relationship with the gripper, the gripper will tend to encourage the container into a more coaxial relationship. Further, the specific configuration of gripper herein disclosed allows the use of a lower housing having a diameter of only approximately one-half of the diameter of the maximum finger extension circle, thereby allowing significant misalignment between the grippers and the containers being engaged. In that regard, the taper 94 at the bottom of the lower housing 50 allows even further misalignment, with the mounting of the gripper through coil spring 70 and pin 54 allowing temporary deflection of the gripper if required for insertion thereof into containers engaged in a substantially misaligned manner.

As described above a gripper assembly, even without ring member 51, will generally align with a container during gripping, so that the most likely or initial gripping orientation will be with the gripper axis and container axis basically aligned. However it was found with the prior art gripper that a container of the type illustrated typically had a plurality of other and undesired stable positions on a gripper, such as the cocked condition illustrated in FIG. 8. That condition is allowed in part by the fact that normally the fingers 58 are not at their maximum radial extension when in the gripping position shown in FIG. 5, allowing them to "follow" the container wall and wedge it at the position shown. The obvious expedient of shortening the fingers so they are at their maximum extension when gripping as desired may avoid the stable position of FIG. 8, but a container assuming the position of FIG. 8 may actually fall off the gripper, as the angularity may allow the fingers to successively avoid the container ridge. The particular problem described may be encountered in ordinary conditions, but is particularly troublesome with the very light, plastic containers and/or high speed equipment. Similarly attempts to avoid the problem by providing some form of ring or enlarged housing on the gripper assembly at or below the finger engagement level have been made, but were found not to reliably and simply avoid the problem.

The addition of the ring 51, however, eliminates the cocking problem previously encountered in a very simple and highly reliable manner. In particular, when the container is in the gripping position as illustrated in FIG. 5, the container top is maintained substantially concentric with the gripper. In addition, the flange 55 on the ring 51 limits the extent of vertical motion of the container toward the gripper, or more particularly limits the vertical motion of any portion of the top of the container, thereby preventing the cocking as illustrated in FIG. 8. Thus, it will be seen that both the radial guide provided by the cylindrical surface 53 and the vertical limit provided by the flange 55 prevent the possibility of the cocking of the container. It should be noted, however, that either limits alone, that is the radial confinement or the vertical confinement is relatively effective for avoiding cocking. In particular, the vertical confinement avoids the possibility of cocking by preventing any region of the container from tipping upward as required for a container moving to the cocked position. The radial limitation on the other hand also tends to avoid cocking in that it prevents the normal eccentricity between the container top and the gripper body characteristic of the stable cocked position. In essence the fingers themselves tend to encourage concentricity of the container with the gripper at the level of engagement of the fingers with the container, so that establishment of concentricity at any other level also assures such alignment.

Now referring to FIG. 4, a view of the gripper 38 shown in partial cross section during engagement with a container 24 may be seen. It will be noted that during insertion of the gripper into a container the actuator is effectively decoupled from the motion of the fingers 58 by the actuator spring 76, and because of the proportions of the fingers 58 with respect to the pivot on pin 84, the container has a relatively high degree of leverage for encouraging the fingers upward as shown in the FIGURE to enable relatively low force entry of the gripper into the container. However, because of the relatively shallow angle of the grippers 58, once positioned within the container as shown in FIG. 5, rather positive locking of the container with respect thereto is achieved. In that regard it should be noted that in the preferred embodiment the fingers 58 are Delrin, and accordingly once the fingers move above ridge 92 they are generally free to slide out of the container because of the relatively low friction therebetween. However if desired, a rubber-like material could be used for the fingertips to provide a high sliding friction to retain containers other than by the ridge adjacent the top thereof, though unless such an arrangement is necessary, it is not preferred.

As the gripper approaches a container as illustrated in FIG. 4 the taper 94 will encourage course alignment of the gripper with the container 24 if the two are initially badly misaligned, allowing the lower cylindrical portion of the lower housing 50 to pass into the container opening. Since the fingers 58 in the preferred embodiment have an upper limit in the range of travel, the lower surfaces of the three fingers tend to define a tapered or conical region encouraging the container and gripper into further alignment, at least within the limits of the tapered or inclined region 57 of the ring 51. In that regard the relieved areas 59 do not restrict the upward folding of the fingers. When folded in the upward position, however, the fingers force alignment of the top of the container with the gripper within a range which will be picked up by the taper or inclined region 57 on the ring 51, thereby finally encouraging alignment of the upper region of the container with the cylindrical portion 53 of the ring.

It will be noted from FIG. 5 that when the gripper is engaging a container for transport the top of the container is displaced below the lower surface of the flange 55 by a significant amount. This clearance has a number of purposes. In particular, when engaging a container as illustrated in FIG. 4, the gripper preferably is pushed into the container slightly further than the relative position shown in FIG. 5 to be sure that the fingers properly pass below the top region of the container, giving reasonable leeway for container, gripper and other dimensional variations. Accordingly some of the vertical freedom provided is used for this purpose. Also there may be some relative upward movement of the container during release thereof induced by the upward movement of the tips of the fingers at that time. Finally, the equipment on which the preferred embodiment of the present invention is used is adjustable so that the relative vertical movement of the grippers with respect to the containers may be controlled, though in order to make this control relatively non-critical additional vertical freedom between the top of the container and the flange is preferred. Obviously, however, even if this adjustment were off so far as to push the gripper into the container until the flange 55 struck the top of the container, the nature of the mounting is such that the spring 70 would allow the gripper to stop at that point, perhaps resulting in somewhat noisier operation but otherwise not being detrimental in any respect.

Figure 6:
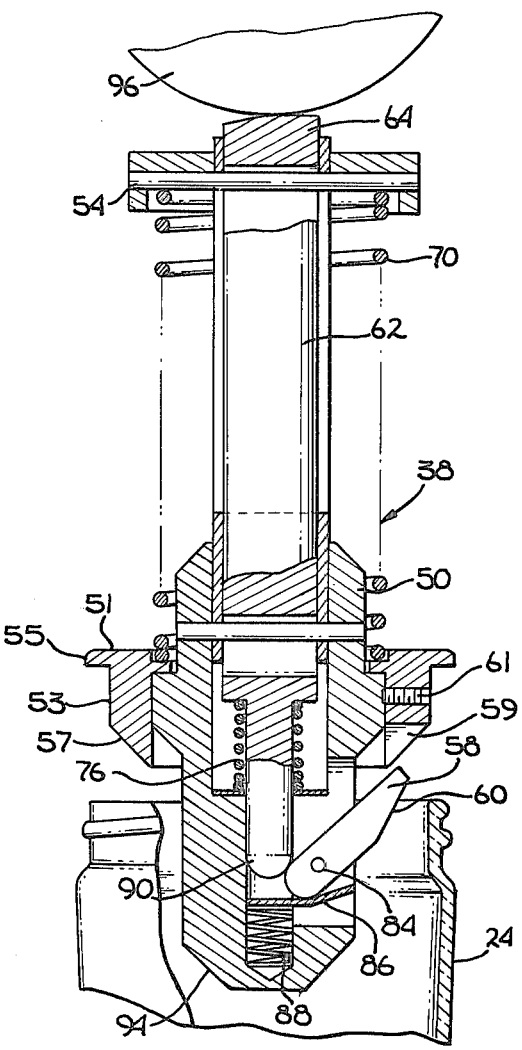
FIG. 6 is a partial cross section of a gripper illustrating the actuation of the gripper for the release of a container previously held thereby.

Now referring to FIG. 6, a partial cross-sectional view of the gripper 38 while releasing a container 24 may be seen. A roller 96 supported on the same shaft as sprocket 34 (see FIG. 1) is disposed to engage the top 64 of the actuator 62 to encourage the actuator toward its lowermost position. This forces end 90 of the actuator 62 downward against the inner end of fingers 58, thereby causing the fingers to deflect upward against the resistance of coil spring 88, moving the fingers inward to a smaller radius to allow clearance between the gripper and the container. By providing a small amount of space for the settling of the containers onto a receiving conveyor 22, the containers will settle downward, assuring that the fingers 58 may not again extend over the ridge 92 on the container to again grasp the container at that location. Thus while the desired function contemplates holding the actuator 62 downward as the entire gripper is lifted upward out of the containers, in the preferred embodiment a positive high reliability release has been obtained by the use of rollers, such as rollers 96, only relatively momentarily holding the actuators downward, provided some slight space is allowed for the settling of the containers onto the receiving conveyor once released. This is a substantial advantage, as negligible friction is encountered between the actuator 62 and the roller moving substantially in unison therewith, as would otherwise be encountered if extended cam surfaces or the like were required to hold the actuator downward for a sustained period. (The duration of depression of the actuator 62 and the extent of settling of the container onto the receiving conveyor 22 which are required to assure a positive release will in general depend upon whether or not the gripper will retain the containers being handled other than by a ridge such as the ridge 92.) As an alternative a relatively low force coil spring or spring loaded member could be disposed around the cylindrical section 53 of the ring 51 so as to engage the top of the container and deflect prior to the fingers 58 reaching the gripping position shown in FIG. 5. Such an arrangement would still assure alignment of the gripper and container axis though would force the container downward at the release point to strip the container from the gripper very quickly rather than relying on gravity, an alternate which may be useful in the case of very high speed machines and/or for use with very light containers. Obviously the spring force must be maintained in proportion with the other spring forces so that the combination of this spring force and the forces caused by the spring loaded fingers remain below the spring force of spring 70.

There has been described herein a substantial and novel improvement in grippers for containers in the processing and packaging industries which provides both positive gripping and positive alignment of the containers. Obviously, while only certain embodiments of the present invention has been described herein, that is, embodiments specifically adapted for direct application to uncasers in accordance with U.S. Pat. No. 3,938,847, it will be understood by those skilled in the art that various changes in form and detail may be made therein depending upon the exact nature of the grippers to be used, containers to be handled and the transport mechanism on which the grippers are to be mounted, all within the spirit and scope of the present invention.

I claim:

1. Container gripper apparatus for gripping a container from within upon engagement along a longitudinal axis comprising:
   a housing means;
   a plurality of gripper members, said gripper members being spaced about the periphery of said housing means adjacent the lower end thereof and extending generally radially outward therefrom, each of said gripper members being coupled to said housing means for rotation between extended and retracted positions about axes generally perpendicular to and spaced from said longitudinal axis;
   means for yieldably encouraging said gripper members to the extended position;
   an actuator, said actuator being slidably coupled to said housing for relative sliding motion with respect thereto in the direction of said longitudinal axis between extended and depressed positions, said actuator being disposed to engage the inward extending ends of said gripper members when moved to said depressed position, and
   guide means associated with said housing means for confining the relative location of the top of a container held thereby, said gripper members being rotatable upward upon contact with the mouth of a container so as to encourage approximate coaxial alignment between said gripper apparatus and said container, said guide means being positioned above said gripper members so as to receive the substantially coaxially aligned top of said container and to confine the relative location thereof.

2. The apparatus of claim 1 wherein said guide means comprises means for limiting the relative longitudinal movement of a container toward said gripper apparatus.

3. The apparatus of claim 2 wherein said guide means also comprises means for limiting the relative radial movement between a container and said gripper apparatus.

4. The apparatus of claim 1 wherein said guide means comprises means for limiting the relative radial movement between a container and said gripper apparatus.

5. Container gripper apparatus for gripping a container from within upon engagement along a longitudinal axis comprising:
   a housing means;
   a plurality of gripper members, said gripper members being spaced about the periphery of said housing means adjacent the lower end thereof and extending generally radially outward therefrom, each of said gripper members being coupled to said housing means for rotation between extended and retracted positions about axes generally perpendicular to and spaced from said longitudinal axis;

means for yieldably encouraging said gripper members to the extended position;

an actuator, said actuator being slidably coupled to said housing for relative sliding motion with respect thereto in the direction of said longitudinal axis between extended and depressed positions, said actuator being disposed to engage the inward extending ends of said gripper members when moved to said depressed position, and guide means associated with said housing means for confining the relative location of the top of a container held thereby, said gripper members being rotatable upward upon contact with the mouth of a container so as to encourage approximate coaxial alignment between said gripper apparatus and said container, said guide means being positioned above said gripper members so as to receive the substantially coaxially aligned top of said container and to confine the relative location thereof.

6. The apparatus of claim 5 wherein said guide means comprises means for limiting the relative longitudinal movement of a container toward said gripper apparatus.

7. The apparatus of claim 6 wherein said guide means also comprises means for limiting the relative radial movement between a container and said gripper apparatus.

8. The apparatus of claim 5 wherein said guide means comprises means for limiting the relative radial movement between a container and said gripper apparatus.

9. A container gripper apparatus for engaging and transporting containers of glass, plastic and like materials comprising:

a housing means;

a plurality of gripper members, said gripper members being equally spaced about the periphery of said housing means adjacent the lower end thereof and extending generally radially outward therefrom, each of said gripper members being coupled to said housing means for rotation between extended and retracted positions about axes generally perpendicular to and spaced from said longitudinal axis, the outer end of said gripper members extending further radially outward when in the extended position than in said retracted position, and being rotatable upward toward said retracted position upon contact with a container opening;

means for yieldably encouraging said gripper members to the extended position;

an actuator, said actuator being slidably coupled to said housing for relative sliding motion with respect thereto in the direction of said longitudinal axis between extended and depressed positions, said actuator being disposed to engage the inward extending ends of said gripper members when moved to said depressed position;

said housing means including guide means above said gripper members for receiving the top of a container substantially aligned with said housing means by said gripper members, for limiting the relative longitudinal movement of a container toward said gripper apparatus and for limiting the relative radial movement between a container and said gripper apparatus, said guide means being inclined adjacent its lower end for encouraging further alignment between a container and said gripper apparatus as said gripper apparatus approaches a gripping relationship with the container.

10. The apparatus of claim 9 wherein said plurality of gripper members comprises at least three gripper members.

11. The apparatus of claim 10 further comprised of a support for coupling to a transport system and a mounting spring means, said housing means being coupled to said support so as to be movable along said longitudinal axis between upper and lower positions with respect thereto, said mounting spring means being a means for encouraging said housing means to said lower position.

* * * * *